Figure 1:
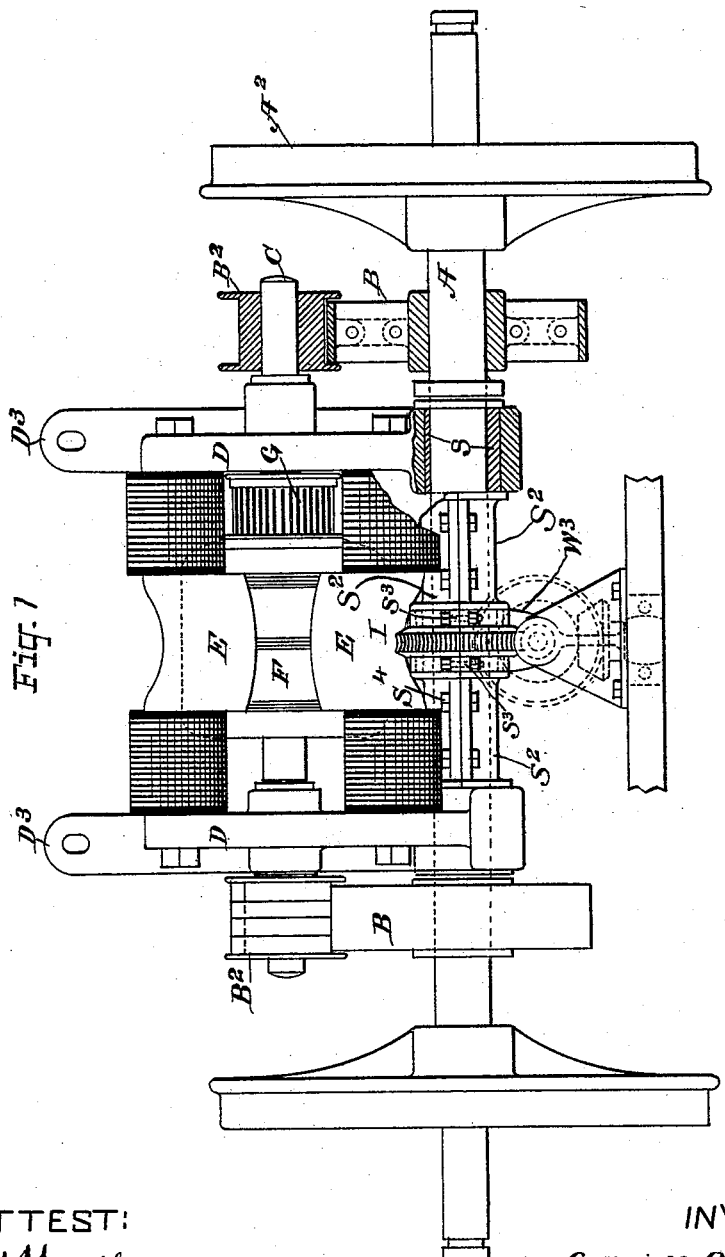

(No Model.) 4 Sheets—Sheet 1.

C. O. MAILLOUX.
FRICTION GEAR FOR ELECTRIC CAR MOTORS.

No. 457,359. Patented Aug. 11, 1891.

ATTEST:
J. H. Hurdle
W. H. Capel

INVENTOR:
Cyprien O. Mailloux
By H. C. Townsend
Attorney (No Model.)  4 Sheets—Sheet 2.

C. O. MAILLOUX.
FRICTION GEAR FOR ELECTRIC CAR MOTORS.

No. 457,359.  Patented Aug. 11, 1891.

ATTEST:

INVENTOR:
Cyprien O. Mailloux
By H. L. Townsend
Attorney (No Model.)  4 Sheets—Sheet 3.
C. O. MAILLOUX.
FRICTION GEAR FOR ELECTRIC CAR MOTORS.
No. 457,359. Patented Aug. 11, 1891.
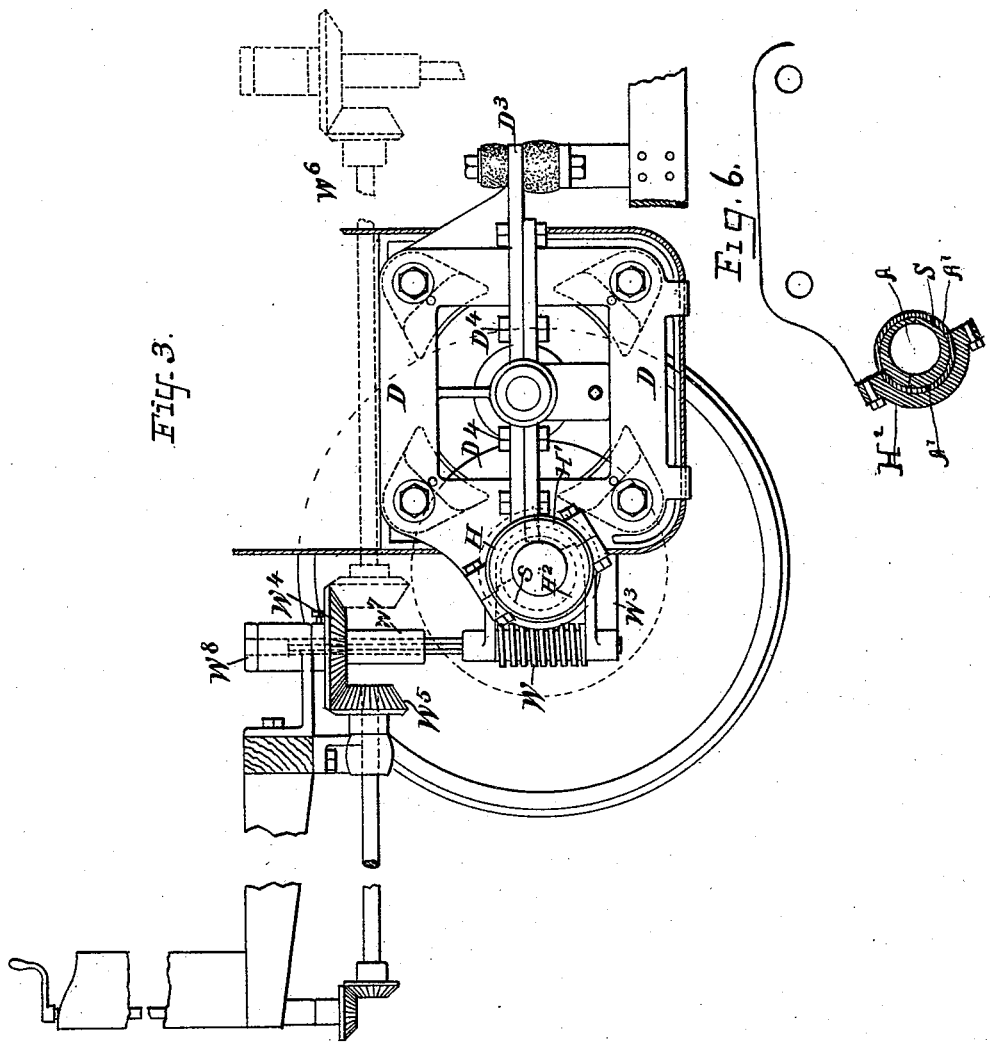
ATTEST:
J. A. Hurdle
Wm. H. Capel.
INVENTOR:
Cyprien O. Mailloux
By H. L. Townsend
Attorney (No Model.) 4 Sheets—Sheet 4.
C. O. MAILLOUX.
FRICTION GEAR FOR ELECTRIC CAR MOTORS.
No. 457,359. Patented Aug. 11, 1891.
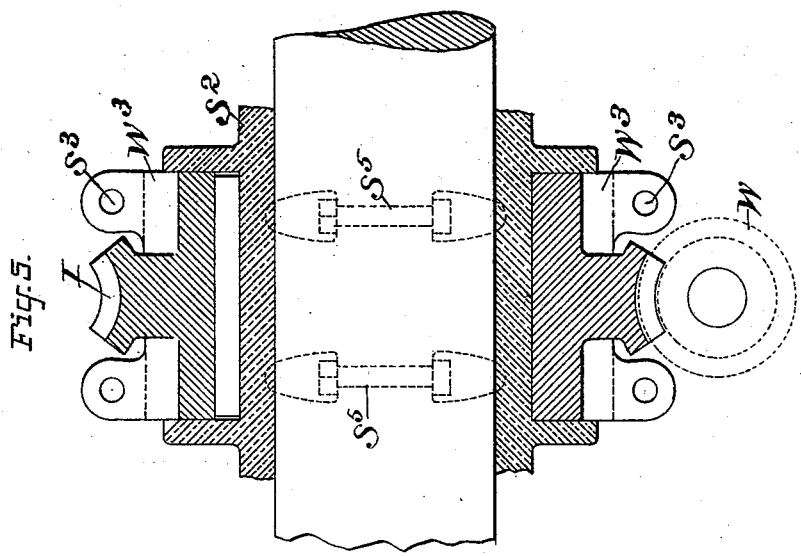
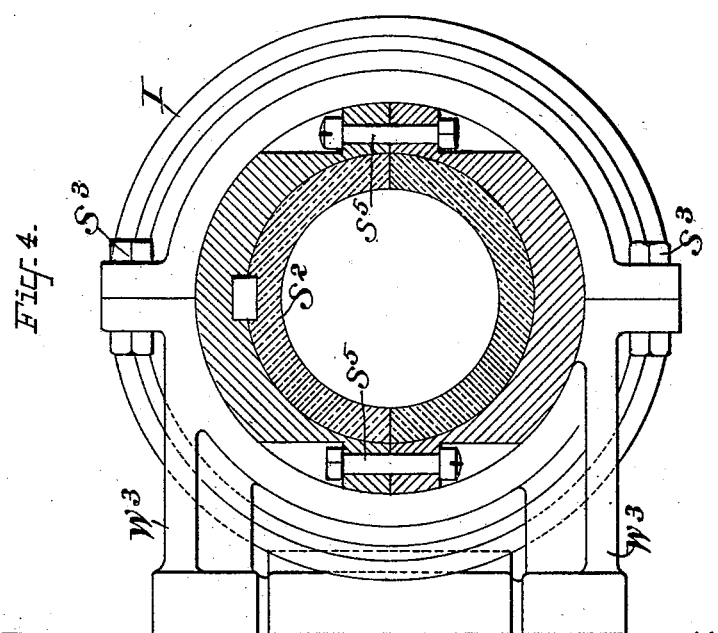
ATTEST:
J. A. Hurdle
T. F. Cowrey
INVENTOR:
Cyprien O. Mailloux
By H. C. Townsend
Attorney

UNITED STATES PATENT OFFICE.

CYPRIEN O. MAILLOUX, OF NEW YORK, N. Y.

FRICTION-GEAR FOR ELECTRIC-CAR MOTORS.

SPECIFICATION forming part of Letters Patent No. 457,359, dated August 11, 1891.

Application filed March 18, 1891. Serial No. 385,492. (No model.)

*To all whom it may concern:*

Be it known that I, CYPRIEN O. MAILLOUX, a citizen of the United States, and a resident of New York, in the county of New York and State of New York, have invented certain new and useful Friction-Gears for Electric-Car Motors, of which the following is a specification.

My invention relates to the manner of mounting electric motors employed for running railway-cars or other vehicles; and the object of the invention is to provide a simple and effective means whereby two members of a gear or train connecting the armature of the machine with the axle of the vehicle may be moved to or from one another for the purpose of connecting or disconnecting the driving from the driven axle or shaft.

My invention consists, essentially, in sleeving the driving-motor upon a shaft or bearing parallel to the driven axle, but preferably upon the driven axle or shaft itself, and interposing an eccentric sleeve between the motor-bearings and the shaft or axle, said sleeve being combined with means whereby it may be adjusted circumferentially about the shaft or bearing and set in any particular position, thereby moving the motor-frame and armature-shaft bodily, so as to move a member of the gear-train carried by said shaft to or from its opposite member, which is connected directly or indirectly with the axle upon which the motor is sleeved.

My invention is especially useful in those cases where it is desired to connect the armature and the car-axle by a friction-gear, and provides a simple means for gradually coupling the motor to the axle while the motor is in motion.

Preferably in carrying out my invention I use only two friction-wheels, one on the armature-shaft and one on the car-axle, said wheels being properly proportioned to give the desired speed.

It is obvious that my invention may be carried out by using a supporting-frame for the motor or motor-armature of any desired construction, the same being properly sleeved on a shaft or bearing parallel to the armature-shaft; but I have hereinafter described the invention as carried out by the employment of a motor in which the two side frames in which the armature is mounted consists, practically, of magnetic yoke plates or pieces joined by the field-magnet cores and pole-pieces of the electric motor.

Figure 2:
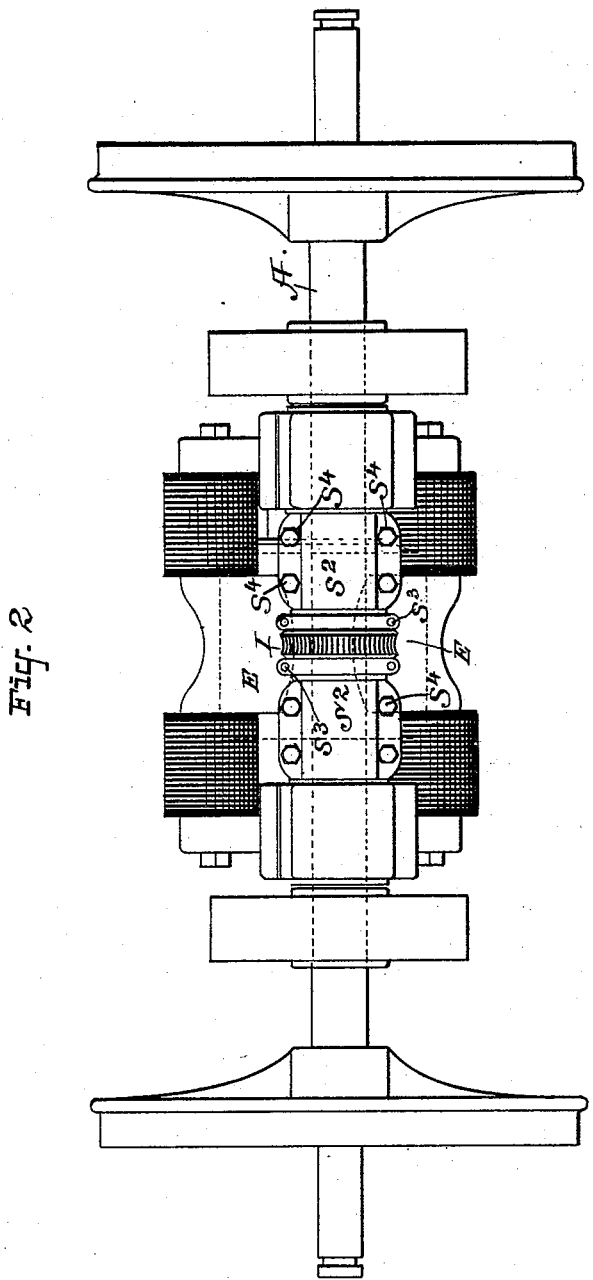

In the accompanying drawings, Figure 1 is a plan of an apparatus embodying my invention. Fig. 2 is an end view of the same. Fig. 3 is a side elevation, parts being shown in vertical section. Fig. 4 is a vertical cross-section through the sleeve and attachment for rotating it. Fig. 5 is a horizontal section at the same point. Fig. 6 is a cross-section through the point of bearing of the frame upon the axle.

A is the car-axle, $A^2$ the car-wheel, and B a friction-wheel fastened to the car-axle and adapted to be driven by another friction-wheel $B^2$, which is fastened on the armature-shaft C of the electric motor. These friction gear-wheels may be of any desired construction, and, if preferred, an intervening loose friction-belt may be employed after the manner used in the gearing known as the "Evans" gear.

The armature-shaft C is mounted in suitable bearings carried by two side frames D D. These side frames, as shown more clearly in Fig. 3 in the form of my invention herein illustrated, consist of the magnetic yoke-pieces which are joined by core-pieces having intermediate consequent pole-pieces E, four in number, between which the armature F of the machine revolves.

G is the commutator-cylinder of the machine, the brushes being omitted for the sake of simplicity. The side frames D are here illustrated as bisected or subdivided on a longitudinal line and the armature-shaft of the machine is supported on the lower section, so that when the two sections are disconnected the lower section, with the armature supported therein, may be lowered away from the upper into a pit for repair. Each upper section has a nose plate or piece $D^3$, which rests upon a suitable cross bar or piece of the truck-frame and is capable of sliding or moving on its support. The two sections of the side frames in which the armature-shaft is journaled are provided with flanges which may be clamped together by bolts indicated at $D^4$. The side frames are sleeved on the car-axle A, the sleeve or bearing being preferably made in three parts H H' H², the two first of which H H' are in one piece, respectively, with the two sections of the frame or yoke-piece D, while the third H² is a cap, which may be fastened to the other two after the manner of a journal-box casing of the ordinary kind. The usual bearings or brasses of a journal-box are applied around the axle or the eccentric in the ordinary way. These bearings or brasses are indicated in Fig. 6 at A⁷. The parts of this sleeve or journal-box are disconnected when the lower portion of the frame is to be removed with the armature.

The construction of the yoke-pieces D in the manner just described is not herein claimed, as it forms the subject of claims in another application for patent filed by me of even date herewith, Serial No. 385,489.

Between the side frames and the axle A, where they are sleeved on said axle, is an interposed eccentric sleeve S, whose internal diameter is the same as that of the axle and whose external diameter is the same as that of the journal bearing or sleeve of the motor-frame. It will be obvious that if this eccentric sleeve be turned or set into different angular positions on the axle A the whole motor-frame, with the armature-shaft supported thereon, will be moved backward or forward away from the car-axle, so that the member B² of the friction-gear will be moved into or out of engagement with its opposite member or will have its friction or pressure upon the latter varied. Hence by providing proper means for adjusting and setting the eccentric sleeve on the axle circumferentially I may at pleasure connect or disconnect the gears and regulate the tension or pressure between them.

The sleeve S is made in two parts to facilitate the application of it to the car-axle, and the parts surrounded, respectively, by the sleeves on the two side frames are preferably formed integral with parts or extensions S², that surround the axle between the points of bearing of the frame, and are provided at an intermediate part, as shown in the cross-section, with flanges between which the wheel I rests. The wheel I is made in two parts, the hub portions of which are clamped together over the two portions of the sleeve S² by means of bolts. (Indicated at S⁵, Figs. 4 and 5.) The two parts of the sleeve or extensions thereof S² are clamped together by means of bolts S⁴, passing through flanges extending from said parts.

The wheel I may be, as shown, a worm-wheel, with which engages a worm W. The shaft of the worm-wheel is mounted in brackets W³, which are made in two parts and sleeved on the hub of the wheel I, the two parts being connected by bolts at S³. The shaft of the worm-wheel connects by means of a spline with a sleeve W⁷, to which is fastened a beveled gear-wheel W⁴, engaged by another wheel W⁵, to the shaft of which latter rotation may be imparted from a car-platform or other point. The sleeve W⁷ has a head W⁸, by which the sleeve is sustained in a bracket or bearing attached to any suitable support—as, for instance, to the car-sill—and the shaft of the wheel W⁵ is similarly supported. By means of the spline connection between the sleeve and the worm-wheel shaft a sliding movement is permitted when the car-body moves up and down; but the bevel-gear is at all times in operative connection with the worm-wheel W.

It is obvious that other means might be employed for setting or adjusting the circumferential position of the eccentric sleeve. The devices shown are merely typical of a great number of mechanisms that might be employed for the purpose.

As indicated, the wheel W⁴ might impart movement to a horizontal shaft W⁶, which through similar gearing could be employed for simultaneously adjusting the friction-gear of another motor connected to another axle of the car.

What I claim as my invention is—

1. The combination, with the driven shaft, of the motor sleeved on suitable shaft or bearing and having its armature-shaft parallel therewith, an interposed eccentric sleeve, and means for rotating the latter to adjust the relation of the gear between the armature-shaft and said driven shaft.

2. In an electric-railway motor, the combination, with an electric motor sleeved on the car-axle or other shaft or bearing, of an intermediate eccentric sleeve, means for adjusting the latter circumferentially on the axle, an armature-shaft parallel to the car-axle, and an intermediate friction-gear, as and for the purpose described.

3. In an electric-railway motor, the combination, substantially as described, of the field-magnet yoke plates or pieces sleeved on the car-axle and forming side frames or bars on which the armature is mounted, of the intermediate eccentric sleeve between the axle and the yoke-bearings, and a worm or other gear wheel connected to said sleeve and surrounding the said axle, as and for the purpose described.

4. The combination, with an electric motor having the supporting side frames for its armature sleeved on the car-axle, of the intermediate eccentric sleeves between the bearings for the frame and the axle, and the wheel between the two sleeves connected to longitudinal extensions of the same, whereby the sleeves may be adjusted around the axle.

5. In an electric-railway motor, the combination, substantially as described, of the armature-supporting frame sleeved on suitable bearings parallel to the armature-shaft and car-axle, the intermediate eccentric sleeve, and means for rotating and adjusting said sleeve, as and for the purpose described.

6. In an electric-railway motor, the combination, with the gear-wheels, one attached to the car-axle, the other to a shaft parallel to said axle, a supporting-frame for said shaft sleeved on the car-axle, and a circumferentially-adjustable eccentric sleeve between the axle and bearings for said frame.

7. The combination, substantially as described, in a railway-car motor, of the armature-supporting frame sleeved on the car-axle, an intermediate eccentric sleeve circumferentially adjustable on said axle, and tubular extensions from said sleeves made in two parts provided with flanges $S^2$ $S^3$, and a wheel between said extensions and connected with the same, as and for the purpose described.

Signed at New York, in the county of New York and State of New York, this 24th day of February, A. D. 1891.

CYPRIEN O. MAILLOUX.

Witnesses:
WM. H. CAPEL,
T. F. CONREY.